United States Patent
Moon et al.

(10) Patent No.: US 10,753,601 B2
(45) Date of Patent: *Aug. 25, 2020

(54) LOWER STRUCTURE COOLING APPARATUS FOR NUCLEAR REACTOR STEAM GENERATOR

(71) Applicant: In Dug Moon, Gyeongsangbuk-do (KR)

(72) Inventors: In Dug Moon, Gyeongsangbuk-do (KR); Sun Jae Moon, Gyeongsangbuk-do (KR)

( * ) Notice: Subject to any disclaimer, the term of this patent is extended or adjusted under 35 U.S.C. 154(b) by 153 days.

This patent is subject to a terminal disclaimer.

(21) Appl. No.: 16/078,658

(22) PCT Filed: Feb. 21, 2017

(86) PCT No.: PCT/KR2017/001895
§ 371 (c)(1),
(2) Date: Aug. 22, 2018

(87) PCT Pub. No.: WO2017/146441
PCT Pub. Date: Aug. 31, 2017

(65) Prior Publication Data
US 2019/0049105 A1    Feb. 14, 2019

(30) Foreign Application Priority Data
Feb. 23, 2016    (KR) .......... 10-2016-0021202

(51) Int. Cl.
| | | |
|---|---|---|
| G21C 5/10 | (2006.01) | |
| F22B 37/24 | (2006.01) | |
| G21D 1/00 | (2006.01) | |
| G21C 13/024 | (2006.01) | |
| F22B 37/02 | (2006.01) | |

(Continued)

(52) U.S. Cl.
CPC .............. F22B 37/24 (2013.01); F22B 37/02 (2013.01); G21C 13/024 (2013.01); G21C 15/253 (2013.01); G21D 1/00 (2013.01); F22B 37/002 (2013.01); F22B 37/242 (2013.01); Y02E 30/32 (2013.01)

(58) Field of Classification Search
CPC ........ G21C 5/10; G21C 13/024; G21C 15/18; G21C 15/24
See application file for complete search history.

(56) References Cited

U.S. PATENT DOCUMENTS 3,549,493 A * 12/1970 Germer .................... G21C 5/10
376/176
3,979,866 A * 9/1976 Prescott ................. G21C 11/08
376/289

(Continued)

Primary Examiner — Gregory A Wilson
(74) Attorney, Agent, or Firm — Mark M. Friedman (57) ABSTRACT

An apparatus for cooling a substructure of a steam generator in a nuclear reactor is provided. The apparatus includes a plurality of stud bolts (110) fastening a skirt of the steam generator to a sliding base. Each stud bolt is provided at the center thereof with an axial through hole (112), a flange of the skirt is provided on one side thereof with a vent passage (122), and each stud bolt is provided with at least one vent hole (114) communicating with the axial through hole (112), thereby forming an air circulation/cooling path between the vent passage (122) and the axial through hole (112) via the vent hole (114).

5 Claims, 5 Drawing Sheets

(51) Int. Cl.
*G21C 15/253* (2006.01)
*F22B 37/00* (2006.01)

(56) References Cited

U.S. PATENT DOCUMENTS

| | | | | |
|---|---|---|---|---|
| 4,284,474 A | * | 8/1981 | Lemercier | G21C 11/08 |
| | | | | 376/290 |
| 4,654,188 A | * | 3/1987 | Hankinson | G21C 11/02 |
| | | | | 250/515.1 |
| 5,930,320 A | * | 7/1999 | Challberg | G21C 13/02 |
| | | | | 376/285 |
| 6,888,909 B2 | * | 5/2005 | Forsyth | G21C 5/10 |
| | | | | 376/294 |
| 6,980,620 B2 | * | 12/2005 | Morel | G21C 5/06 |
| | | | | 376/261 |
| 7,751,522 B2 | * | 7/2010 | Leibold | G21C 5/10 |
| | | | | 376/294 |
| 9,875,817 B2 | * | 1/2018 | Edwards | G21C 9/016 |
| 10,249,393 B2 | * | 4/2019 | Park | G21C 15/12 |

* cited by examiner

LOWER STRUCTURE COOLING APPARATUS FOR NUCLEAR REACTOR STEAM GENERATOR

TECHNICAL FIELD

The present invention relates to an apparatus for cooling a substructure positioned underneath a steam generator in a nuclear reactor. More particularly, the present invention relates to an apparatus for cooling a substructure of a steam generator in a nuclear reactor, wherein a stud bolt for connecting a skirt and a sliding base of the steam generator in a nuclear reactor is provided with a venturi-type axial through hole and a plurality of inclined vent holes, a skirt flange is provided on one side thereof with a vent passage, and the skirt is provided on the bottom thereof with a plurality of air-passing grooves such that an air circulation/cooling path is formed between a dead air region in the substructure and surroundings through the axial through hole via the inclined vent holes, the air-passing grooves, and the vent passage, thereby cooling the stud bolt and the sliding base to prevent them from being thermally damaged and thus improve operating stability of a nuclear reactor system facility.

BACKGROUND ART

As well known in the art, exemplary nuclear reactors in South Korea include System Plus 80 from Combustion Engineering (CE)(e.g. Hanbit Nuclear Power Plant (NPP) Units 3 and 4), Korean Standard Nuclear Reactors (e.g. Hanul NPP Units 3, 4, 5, and 6; Hanbit NPP Units 5 and 6), OPR1000 (e.g. new Kori NPP Units 1 and 2), APR1400 (new Kori Units 3 and 4, new Ulgin Units 1 and 2, UAE NPP Units 1 to 4), 2-loop Pressurized Water Reactor, etc.

Such NPPs (referred hereinafter simply to as "Nuclear Reactors") include reactor coolant systems (RCSs) in reactor containment buildings as also disclosed in Korean Patent No. 10-1473665 entitled "Tubing Support Apparatus for Replacement of Parts of Nuclear Power Plant".

The RCS includes a reactor containing atomic piles and at least one heat-transfer circuit connected thereto.

The circuit includes a steam generator and at least one coolant pump that circulates coolant between the steam generator and the reactor.

In addition, the circuit includes a pressurizer that allows the temperature and pressure of the coolant to be kept constant.

A first large-diameter pipe or a hot leg is connected to one side of the reactor and one side of a suction part of a coolant chamber in the steam generator so as to transmit the coolant, which is heated with contact with a core of the reactor, to the steam generator.

Further, a circulation pipe called a cross-over leg connects one side of an outlet of the coolant chamber and one side of an inlet of a swirl chamber in the coolant chamber.

A cold leg connects the swirl chamber in the coolant chamber and the reactor. The coolant that is cooled at the steam generator and drawn by the coolant pump is transmitted to the reactor via the circulation pipe and the cold leg to cool the core.

Figure 1:
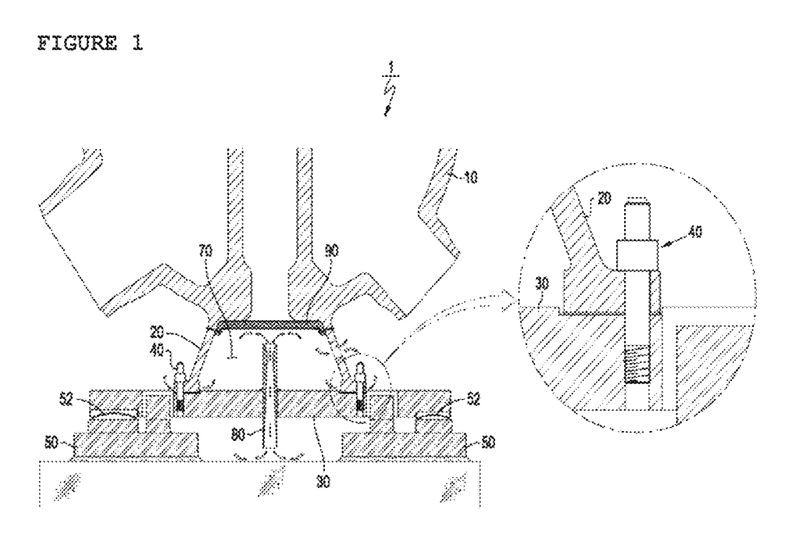
FIG. 1 is a longitudinal-sectional view of a substructure of a steam generator in a nuclear reactor, wherein the substructure is provided with a conventional solid stud bolt.

In such a nuclear reactor, the steam generator 1 has a typical substructure as shown in FIG. 1.

That is, the steam generator 1 of the nuclear reactor 1 includes a stay cylinder 10 that is maintained at high temperature and a cylindrical skirt 20 that supports the stay cylinder from a lower section thereof.

The skirt 20 is fixedly supported at the bottom thereof by a sliding base 30 by means of a plurality of stud bolts 40. The sliding base 30 is supported by a plurality of (e.g. four) semi-spherical sliders 52, which is provided on a forged bolted plate 50 so as to accommodate a slight motion occurring during the operation of a nuclear reactor.

In this structure, the stud bolt 40 has a conventional solid bolt structure.

Figure 2:
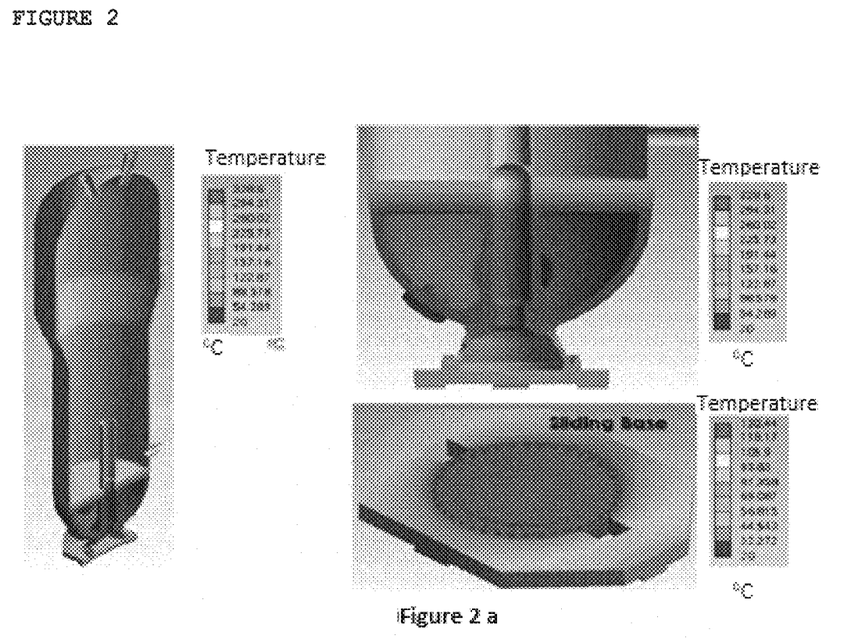
FIG. 2a is a heat analysis thermal distribution diagram for the substructure of the steam generator in the conventional nuclear reactor, in which the diagram shows a thermal distribution of a dead air region defined by a skirt and a sliding base being heated to high temperature (up to 131° C.) due to high temperature heat generated during operation of the nuclear reactor.
FIG. 2b is a heat analysis thermal distribution diagram showing that the temperature of a dead air region defined by a skirt and a sliding base is reduced by 40% or more compared to that of a conventional nuclear reactor according to the present invention.

During operation, the steam generator produces high temperature heat that, when transmitted to the lower side sliding base 30, elevates the temperature of the sliding base 30 as shown in a heat analysis thermal distribution diagram of FIG. 2a.

The heat analysis thermal distribution diagram shows that, as a result of analysis with respect of an insulation state, an operation temperature, material, heat transfer, an air flow around a steam generator, etc, a dead air region 70 defined by the skirt 20 and the sliding base 30 is heated to high temperature of up to 131° C. through convection and radiation of high temperature heat (300° C. or more) from the steam generator 1. It could be seen that in such a high temperature state, the skirt 20 was subjected to thermal deformation (e.g. thermal expansion of up to 2.4 mm).

The thermal deformation of the sliding base 30 also causes serious problems as follows.

The thermal deformation, such as thermal expansion, of the sliding base 30 causes restriction to a free motion of the sliding base 30 or interference with an upper surrounding structure of the steam generator 1, resulting in structural vibration of the steam generator 1 and the coolant pump.

The structural vibration causes pipe wearing and vibration stress to the steam generator 1 and after a long operation time, causes material fatigue of small-diameter pipes that have borate embrittlement due to accumulated borate, leading to leakage of a boric acid solution.

Further, as a construction factor of the plumbing in a nuclear reactor, due to weld contraction occurring by a final connection welding between an intermediate pipe and a steam generator nozzle, residual stress remains in the sliding base and a vertical support for a pump. Due to the residual stress, subsidence of the sliding base 30 occurs in response to the weld contraction. As a result, after installation of the steam generator and after final connection welding, the sliding base generally sinks by about 1 mm or less.

Such subsidence of the sliding base may be considered as residual stress of the sliding base 30, and it increases friction force with respect to the sliding base at an initial operating stage of a nuclear reactor, interfering with a transverse sliding motion of the sliding base.

Further, thermal deformation of the sliding base also causes the operating steam generator to be tilted, which may lead to misalignment of parts even after cold shutdown of the steam generator.

Consequently, if the sliding base is deformed so as to be inclined, the steam generator is accordingly tilted so that deformation and interference occur to support structures for the coolant pump and the steam generator, thereby further increasing vibration stress of a nuclear reactor.

It is reported from many countries that such vibration stress causes wear of pipes of the steam generator and of internal components of the coolant pump, and fatigue failure of tubing connected to the RCS during operation of nuclear power plants.

If a nuclear reactor is operated for a long period of time in such condition, a leak may occur from a mechanical seal of a coolant pump and small-diameter pipes in the nuclear reactor.

Accordingly, there is a need to develop a technique to prevent thermal deformation of the sliding base 30 of a nuclear reactor and resultant wear of small pipes of the steam generator and coolant system in a nuclear reactor occurring due to structural vibration of the nuclear reactor.

The applicant has proposed three solutions to address this problem.

A first solution is an air-circulation sleeve 80 that is installed through the center of a sliding base 30 supporting a steam generator to naturally circulate air using a venture effect. This enables a dead air region 70 defined by a stay cylinder and a skirt 20 of the steam generator 1 to be cooled to effectively prevent high temperature heat from being transferred to the sliding base 30 from the steam generator 1, thereby preventing vibrations of a nuclear reactor due to thermal expansion of the sliding base 30.

A second solution is an air-circulating shim plate (not shown) between the bottom of the skirt 20 supporting the steam generator 1 and an engaging surface of the sliding base to allow ambient air to be introduced into a dead air region 70 defined by a stay cylinder and a skirt 20 of the steam generator 1 to be cooled to effectively prevent high temperature heat from being transferred to the sliding base 30 from the steam generator 1, thereby preventing vibrations of a nuclear reactor due to thermal expansion of the sliding base 30.

A third solution is a heat insulation support plate 90 that is closely attached to a lower portion of the steam generator near the stay cylinder and the skirt. The heat insulation support plate is composed of a heat insulation material, a heat shield panel, and a plurality of rigid pieces. The heat insulation support plate is thus prevented from sagging due to operating vibration of a nuclear reactor. The heat insulation support plate serves to effectively prevent high temperature heat from being transferred to the sliding base 30 through the dead air region 70, thereby preventing vibrations of a nuclear reactor due to thermal expansion of the sliding base 30.

The above solutions proposed by the applicant contributes to suppression of thermal deformation of the sliding base 30, having a great effect of stable operation of a nuclear reactor and improvement in lifecycle of equipment of the nuclear reactor.

However, the above solutions are techniques that are applicable at the time of replacement of a steam generator after one cycle of a commercial operation of a nuclear reactor.

Thus, the solutions are difficult to be applied to normally operated nuclear reactor. Further, since even in the operated nuclear reactor, damage of equipment such as a heat pipe or the like can be prevented only when causes of thermal deformation are previously removed, there is a great need to develop a technique for cooling a substructure of a steam generator in a nuclear reactor, wherein the technique is applicable even to a nuclear reactor that is under construction, at a test run stage, or just before replacement of a steam generator.

DISCLOSURE

Technical Problem

Accordingly, the present invention has been made keeping in mind the above problems occurring in the related art, and an object of the present invention is to provide an apparatus for cooling a substructure of a steam generator in a nuclear reactor, the apparatus being easily applicable instantly to a nuclear reactor to reduce wear of a heat pipe of a nuclear reactor and further improve operation stability of a nuclear reactor system facility without large-scale replacement and reinforcement of nuclear equipment.

Another object of the present invention is to provide an apparatus for cooling a substructure of a steam generator in a nuclear reactor, the apparatus being applicable even to a nuclear reactor that is under construction, at a test run stage, or just before replacement of a steam generator to greatly reduce temperature of a dead air region to prevent heat fatigue of stud bolts and resultant thermal deformation of a sliding base with a simple structural feature.

Technical Solution

In order to accomplish the above objects, the present invention provides an apparatus for cooling a substructure of a steam generator in a nuclear reactor, the apparatus including:

a plurality of stud bolts fastening a skirt of the steam generator to a sliding base, wherein each stud bolt is provided at the center thereof with an axial through hole, through which air is circulated to prevent the stud bolt from being heated.

Preferably, the axial through hole may have a venturi-type neck part whose internal flow passage has a reduced diameter to enable air flowing through the flow passage of the neck part to increase in a flow rate and decrease in pressure.

Preferably, a flange of the skirt may be further provided on one side thereof with a vent passage, and each stud bolt may be further provided with a plurality of vent holes communicating with the axial through hole, thereby forming an air circulation/cooling path between the vent passage and the axial through hole via the vent holes.

Preferably, the vent holes may be disposed in the stud bolt at different positions both in an axial direction and a circumferential direction while extending slantingly from an outer circumference of the stud bolt downwards to the axial through hole, thereby preventing the vent holes in the stud bolt from overlapping with each other in a horizontal direction of the stud bolt and from being circumferentially skewed in one side of the stud bolt and preventing a local reduction in strength of the stud bolt in the horizontal direction.

Preferably, the skirt may be further provided on the bottom thereof with a plurality of air-passing grooves to form an air circulation/cooling path between a dead air region defined below the steam generator and a circumferential gap between a bolt hole of the skirt and the outer circumference of the stud bolt, thereby forming an air circulation/cooling path between the dead air region and surroundings via the air-passing grooves, the circumferential gap, the vent holes, the through hole, and the vent passage.

Preferably, the stud bolt may further have a heat sink coupled to an upper threaded part of the stud bolt, wherein the heat sink is provided, on an outer surface of a body thereof coupled to the upper threaded part, with a plurality of heat-dissipation fins to increase a heat-dissipation surface area of the stud bolt to increase a cooling effect.

Advantageous Effects

According to the present invention, the stud bolt for connecting the skirt and the sliding base of the steam generator in a nuclear reactor is provided with the axial through hole and the plurality of vent holes to form an air circulation/cooling path in an axial direction of the stud bolt, thereby cooling the stud bolt and the sliding base and thus effectively preventing thermal deformation thereof.

Further in addition to the axial through hole formed in the stud bolt, the vent passage is formed in one side of the skirt flange and the plurality of air-passing grooves are formed on the bottom of the skirt to form an air circulation/cooling path between the dead air region below the steam generator and the circular gap between the bolt hole of the skirt and the outer circumference of the stud bolt. Further, according to the present invention, the heat sink is coupled to the upper threaded part of the stud bolt.

Accordingly, the apparatus of the present invention is easily applicable to a nuclear reactor to greatly reduce the temperature of the dead air region without large-scale replacement and reinforcement of nuclear equipment, thereby preventing heat fatigue of the stud bolt and resultant thermal deformation of the sliding base.

BEST MODE

Hereinbelow, preferred embodiments of the present invention will be described in detail with reference to the accompanying drawings.

Figure 3:
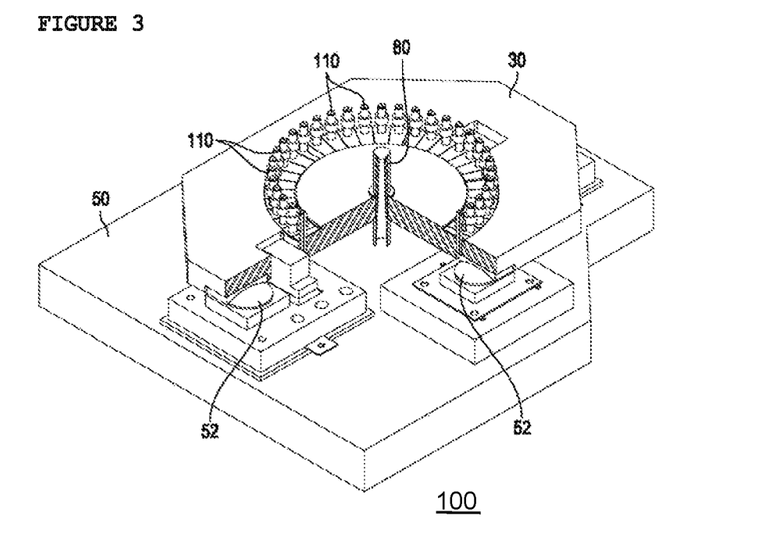
FIG. 3 is a partially broken enlarged view illustrating a stud bolt having an axial through hole being mounted to a substructure of a steam generator in a nuclear reactor according to the present invention.
Figure 4:
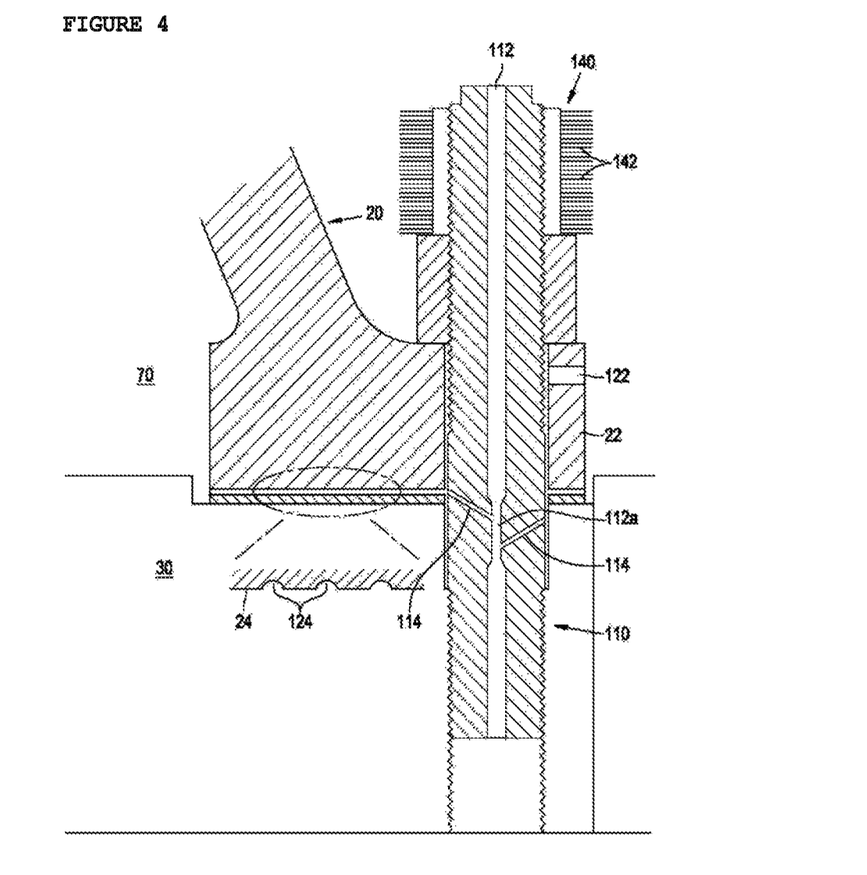
FIG. 4 is a longitudinal-sectional view illustrating a substructure of a steam generator in a nuclear reactor according to the present invention, wherein a stud bolt having an axial through hole and a plurality of vent holes and a plurality of air circulation/cooling paths are provided in the substructure.

As illustrated in FIGS. 3 and 4, an apparatus 100 for cooling a substructure of a steam generator in a nuclear reactor includes a plurality of stud bolts 110 that fastens a skirt 20 of the steam generator 1 to a sliding base 30, wherein each of the stud bolts is provided with a venturi-type axial through hole 112 at the center thereof.

As illustrated in FIG. 3, the stud bolts 110 are disposed around the skirt 20 of the steam generator 1, and each of the stud bolts has the axial through hole 112.

The axial through hole 112 has a venturi-type internal flow passage that is provided with a neck part 112a having a reduced diameter. The neck part 112a has a length of about 30 mm, and air flowing through the neck part increases in a flow rate and decreases in pressure.

Figure 7:
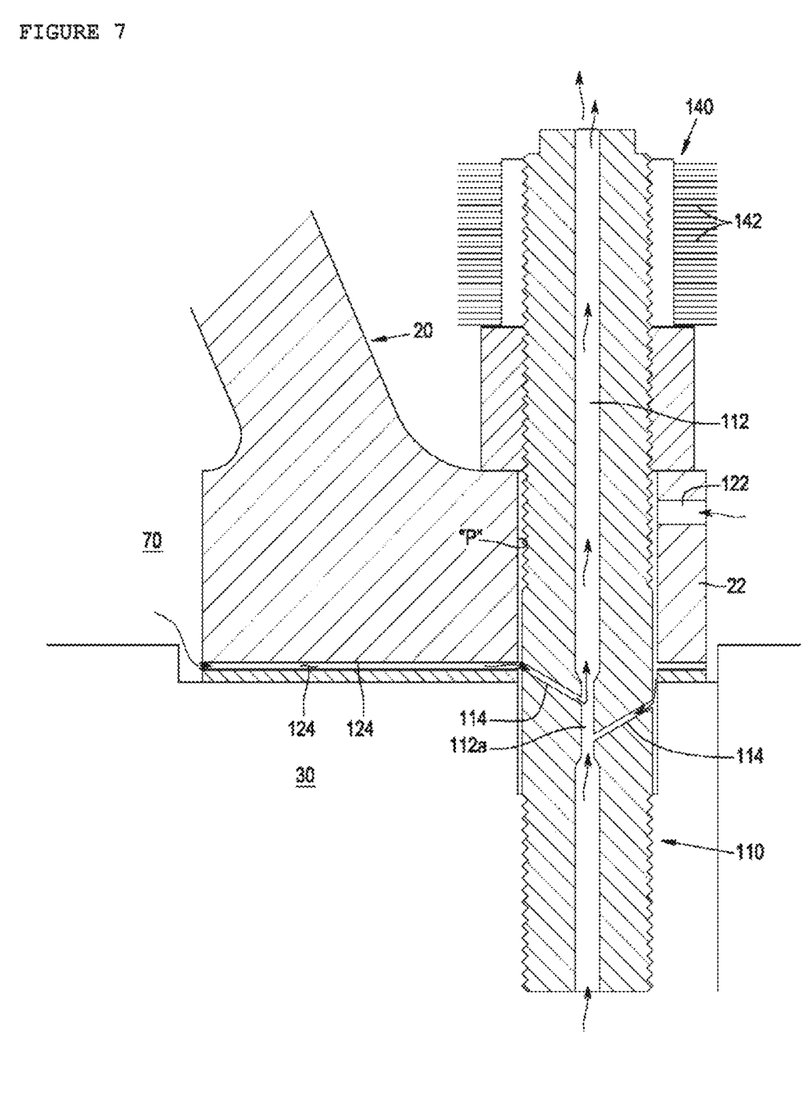
FIG. 7 is a longitudinal-sectional view illustrating a cooling apparatus for a substructure of a steam generator in a nuclear reactor, wherein a plurality of air circulation/cooling paths are formed in the substructure according to the present invention.

According to such a structure, as illustrated in FIGS. 4 and 7, air in a space above and below the sliding base 30 is naturally circulated through the axial through hole 112 of the stud bolt 110, having the effect of preventing the stud bolt 110 from being heated.

In such a structure, a vent pipe (not shown) extending from a fan may be additionally connected to an upper side of the axial through hole 112 so that air can be forcefully circulated.

Further, a flange 22 of the skirt is provided on one side thereof with a vent passage 122 that extends to a bolt hole of the skirt 20, through which the stud bolt 110 is threaded.

Figure 5:
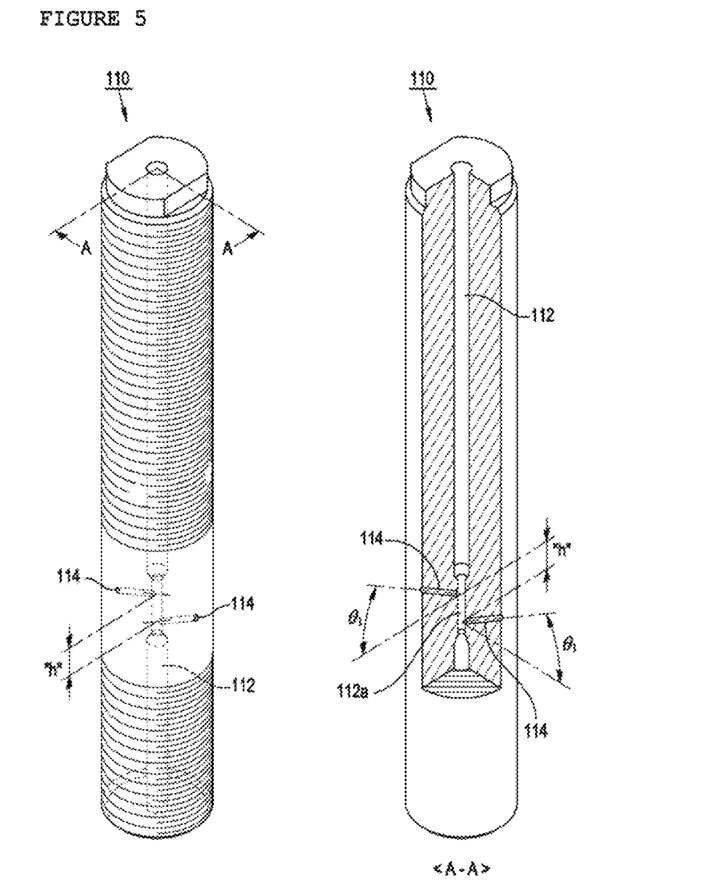
FIG. 5 is a view illustrating a detailed structure of the stud bolt having the axial through hole and the vent holes according to the present invention.

As illustrated with section A-A in FIG. 5, the stud bolt 110 is provided with a plurality of vent holes 114 communicating with the axial through hole 112. Preferably, the plurality of vent holes 114 may extend in an inclined manner.

The vent holes 114 may have an inclination (θ1) of about 30 degrees, for example, in an upper to lower direction, and have different positions in an axial direction of the stud bolt.

That is, the vent holes 114 are disposed in the stud bolt 110 at different positions both in an axial direction and a circumferential direction of the stud bolt while extending slantingly at an angle (θ1) of about 30 degrees from an outer circumference of the stud bolt 110 downwards to the axial through hole 112.

For example, as illustrated in FIG. 5, end points the vent holes 114 at the neck part 112a of the axial through hole 112 are vertically spaced by a height (h) of about 15 mm, thereby being disposed at different vertical positions.

The configuration in which the vent holes 114 have an inclination angle (θ1) of about 30 degrees and a height (h) difference of about 15 mm can allow the strength of the stud bolt 110 to be maintained satisfactorily without making a cross section of the stud bolt fragile, compared to a horizontally extended vent holes.

That is, when a tensile force is applied to the stud bolt 110 mounted in a nuclear reactor, an empty space of the vent holes 114 in the stud bolt is prevented from overlapping with each other along a cross section in a horizontal direction of the stud bolt 110, thereby maintaining satisfactory strength of the stud bolt 110 without making a cross section of the stud bolt fragile, as compared to the horizontally extended vent holes.

Figure 6:
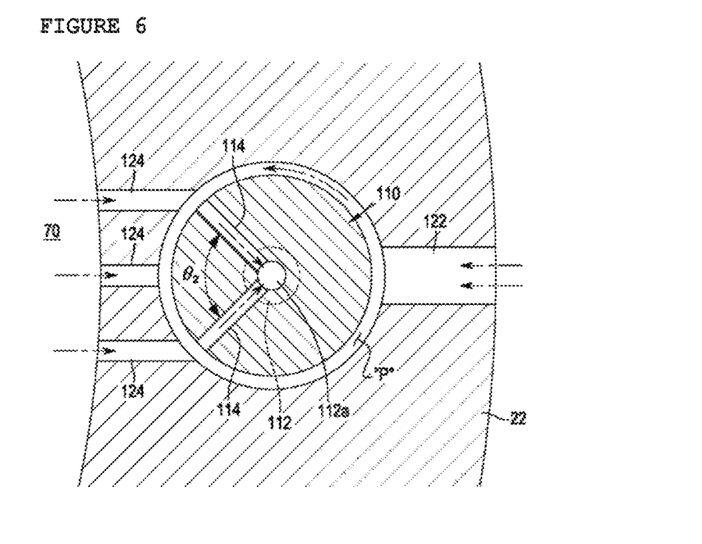
FIG. 6 is a cross-sectional view illustrating an air circulation/cooling path formed by the axial through hole and the vent holes according to the present invention.

Further, as shown in FIG. 6, the vent holes 114 are spaced apart at an angle (θ2) of at least about 60 degrees from each other in a circumferential direction of the stud bolt 110.

The circumferentially spaced angle (θ2) prevents internal spaced of the vent holes 114 from being circumferentially skewed in one side of the stud bolt 110, thereby preventing a local reduction in strength of the stud bolt 110.

As described above, according to the present invention, an air circulation/cooling path is formed between the vent passage 122 and the axial through hole 112 via the circumferential gap P between the bolt hole of the skirt 20 and the outer circumference of the stud bolt 110, and the plurality of vent holes 114.

Thus, ambient air may be naturally circulated or supplied through the vent passage 122. Alternatively, when a vent pipe (not shown) is connected between the upper side of the axial through hole 112 of the stud bolt 110 and a fan, and air is sucked by the fan, as illustrated in FIG. 7, forced air-circulation may be carried out through the stud bolt 110.

Further, as illustrated in FIG. 4, the skirt may be further provided on the bottom 24 thereof with a plurality of air-passing grooves 124.

The air-passing grooves 124 are formed by cutting thereby to form an air circulation/cooling path between a dead air region 70 defined below the steam generator 1 and the circumferential gap P between the bolt hole of the skirt 20 and the outer circumference of the stud bolt 110, thereby allowing air-circulation therethrough.

In this structure, as illustrated in FIGS. 6 and 7, an air circulation/cooling path may be formed between the dead air region 70 and surroundings via the air-passing grooves 124, the circumferential gap P between the bolt hole of the skirt 20 and the outer circumference of the stud bolt 110, the vent holes 114, the through hole 112, and the vent passage 122 in the skirt flange 22.

Further, when a vent pipe (not shown) for a fan is connected to the upper side of the axial through hole 112 of the stud bolt 110 so that air is sucked out of the vent pipe by a fan, forced air-circulation may be formed from the dead air region 70 below the steam generator 1 towards surroundings via the air-passing grooves 124, the circumferential gap P between the bolt hole of the skirt 20 and the outer circumference of the stud bolt 110, the plurality of vent holes 114, and the axial through hole 112.

The stud bolt 110 may further have a heat sink 140 coupled to an upper threaded part of the stud bolt 110.

The heat sink 140 serves as an additional heat-dissipation device that is provided, on an outer surface of a body thereof coupled to the upper threaded part, with a plurality of heat-dissipation fins 142. Thus, the heat sink 140 can increase a heat-dissipation surface area of the stud bolt 110 to increase a cooling effect.

According to the present invention, the stud bolt is provided with an air circulation/cooling path through the stud bolt 110, thereby cooling the stud bolt 110 and the sliding base 30 and thus effectively preventing thermal deformation thereof, and improving operating stability of a nuclear reactor system facility as well.

Particularly, according to the present invention, the apparatus of the present invention is easily applicable to a nuclear reactor to greatly reduce the temperature of the dead air region without large-scale replacement and reinforcement of nuclear equipment, thereby preventing heat fatigue of the stud bolt 110 and resultant thermal deformation of the sliding base 20.

The cooling effect for the stud bolt 110 and the sliding base 30 according to the present invention was shown through a heat analysis thermal distribution diagram of FIG. 2b.

According to the thermal distribution diagram, the cooling effect showed an excellent result in that the temperature of the dead air region 70 defined by the skirt 20 and the sliding base 30 according to the present invention was reduced by about 40% compared to that (up to 131° C.) of a conventional nuclear reactor.

Although a preferred embodiment of the present invention has been described in detail with respect to the accompanying drawings, the present invention is not limited to such preferred embodiment. Those skilled in the art will appreciate that various modifications, additions and substitutions are possible, without departing from the scope and spirit of the invention as disclosed in the accompanying claims. For example, position, number, and shapes of the axial through hole 112, the vent holes 114, the vent passage 122, and the air-passing grooves 124 may vary according to structures of equipment. Such simple modifications in design fairly fall within the scope and spirit of the present invention.

DESCRIPTION OF THE REFERENCE NUMERALS IN THE DRAWINGS

| | |
|---|---|
| 1: Steam generator | 10: Stay cylinder |
| 20: Skirt | 22: Skirt flange |
| 24: Skirt bottom | 30: Sliding base |
| 40: Stud bolt | 50: Forged bolt plate |
| 52: Semi-spherical slider | 70: Dear air region |
| 80: Air-circulation sleeve | 90: Heat insulation support plate |
| 100: Apparatus for cooling a substructure of a steam generator in a nuclear reactor | |
| 110: Stud bolt | 112: Axial through hole |
| 114: Vent hole | 122: Vent passage |
| 124: Air-passing groove | 140: Heat sink |
| 142: Heat-dissipation fin | h: Height |
| P: Circumferential gap | θ1, θ2: Angle |

The invention claimed is:

1. An apparatus for cooling a substructure of a steam generator in a nuclear reactor, the apparatus comprising:
a plurality of stud bolts (110) fastening a skirt of the steam generator to a sliding base,
wherein each stud bolt is provided at the center thereof with an axial through hole (112), a flange of the skirt is provided on one side thereof with a vent passage (122), and each stud bolt is provided with at least one vent hole (114) communicating with the axial through hole (112), thereby forming an air circulation/cooling path between the vent passage (122) and the axial through hole (112) via the vent hole (114).

2. The apparatus of claim 1, wherein the axial through hole (112) has a venturi-type neck part (112a) whose internal flow passage has a reduced diameter to enable air flowing through the flow passage of the neck part (112a) to increase in a flow rate and decrease in pressure.

3. The apparatus of claim 1, wherein the vent holes are disposed in the stud bolt at different positions both in an axial direction and a circumferential direction while extending slantingly from an outer circumference of the stud bolt downwards to the axial through hole so as to prevent a local reduction in strength of the stud bolt in the horizontal direction.

4. The apparatus of claim 1, wherein the skirt is further provided on the bottom thereof with a plurality of air-passing grooves to form an air circulation/cooling path between a dead air region defined below the steam generator and a circumferential gap between a bolt hole of the skirt and the outer circumference of the stud bolt, thereby forming an air circulation/cooling path between the dead air region and the axial through hole via the air-passing grooves, the circumferential gap, and the vent holes.

5. The apparatus of claim 1, wherein the stud bolt further has a heat sink coupled to an upper threaded part of the stud bolt, wherein the heat sink is provided, on an outer surface of a body thereof coupled to the upper threaded part, with a plurality of heat-dissipation fins to increase a heat-dissipation surface area of the stud bolt to increase a cooling effect.

* * * * *